United States Patent
Sato

(12) 
(10) Patent No.: US 8,820,999 B2
(45) Date of Patent: Sep. 2, 2014

(54) TELEVISION AND ELECTRONIC APPARATUS HAVING LIGHTGUIDE INTEGRATED AS PART OF THE HOUSING AND A METHOD OF MAKING

(75) Inventor: Yuki Sato, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 33 days.

(21) Appl. No.: 13/536,691

(22) Filed: Jun. 28, 2012

(65) Prior Publication Data

US 2013/0107568 A1   May 2, 2013

(30) Foreign Application Priority Data

Oct. 28, 2011   (JP) ................. 2011-237143

(51) Int. Cl.
| | | |
|---|---|---|
| F21V 8/00 | (2006.01) | |
| F21V 21/00 | (2006.01) | |
| G06F 1/16 | (2006.01) | |
| G02F 1/1333 | (2006.01) | |
| G02F 1/1335 | (2006.01) | |

(52) U.S. Cl.
CPC ..... *F21V 21/00* (2013.01); *G02F 2001/133314* (2013.01); *G02F 2001/133322* (2013.01); *G02F 1/133615* (2013.01); *G06F 1/1601* (2013.01); *G02B 6/0095* (2013.01); *G02B 6/0088* (2013.01); *G02B 6/0021* (2013.01); *G02B 6/002* (2013.01)
USPC ............. 362/602; 362/362; 362/611

(58) Field of Classification Search
CPC ......... H04N 5/645; G06F 1/18; G06F 1/1652; H04M 1/0266; H04M 2250/22; H05K 5/0017; H05K 7/02

USPC .............. 362/602, 611, 362; 349/58, 62, 122
See application file for complete search history.

(56) References Cited

U.S. PATENT DOCUMENTS

| | | | |
|---|---|---|---|
| 5,808,708 | A | 9/1998 | Oyama et al. |
| 7,092,048 | B2 | 8/2006 | Jeong |
| 2012/0074450 | A1* | 3/2012 | Sakurai et al. ............ 257/98 |

FOREIGN PATENT DOCUMENTS

| | | |
|---|---|---|
| JP | H06-186559 | 7/1994 |
| JP | 08-082795 | 3/1996 |
| JP | 08-166586 | 6/1996 |
| JP | 09-145935 | 6/1997 |
| JP | 10-319246 | 12/1998 |

(Continued)

OTHER PUBLICATIONS

Japanese Office Action mailed Oct. 16, 2012 in priority Japanese Application No. 2011-237143.

(Continued)

*Primary Examiner* — Tracie Y Green
(74) *Attorney, Agent, or Firm* — Knobbe, Martens, Olson & Bear, LLP

(57) ABSTRACT

According to one embodiment, an electronic apparatus includes a housing, a panel, and a light source. The panel includes a display screen. The housing includes a first wall and a second wall. The first wall includes an opening exposing the display screen. The second wall is opposite to the first wall. Light from the light source reaches the panel through the second wall.

33 Claims, 18 Drawing Sheets

(56) References Cited

FOREIGN PATENT DOCUMENTS

| | | |
|---|---|---|
| JP | 11-119702 | 4/1999 |
| JP | 2003-043456 | 2/2003 |
| JP | 2004-319164 | 11/2004 |
| JP | 2005-037644 | 2/2005 |
| JP | 2005-242249 | 9/2005 |
| JP | 2007-134224 | 5/2007 |
| JP | 2009-139958 | 6/2009 |
| JP | 2010-224383 | 10/2010 |
| WO | WO 2011/019050 A1 | 2/2011 |
| WO | WO 2011/080985 A1 | 7/2011 |

OTHER PUBLICATIONS

Japanese Office Action dated Nov. 26, 2013 in Japanese Application No. 2013-095657, 7 pgs.

\* cited by examiner

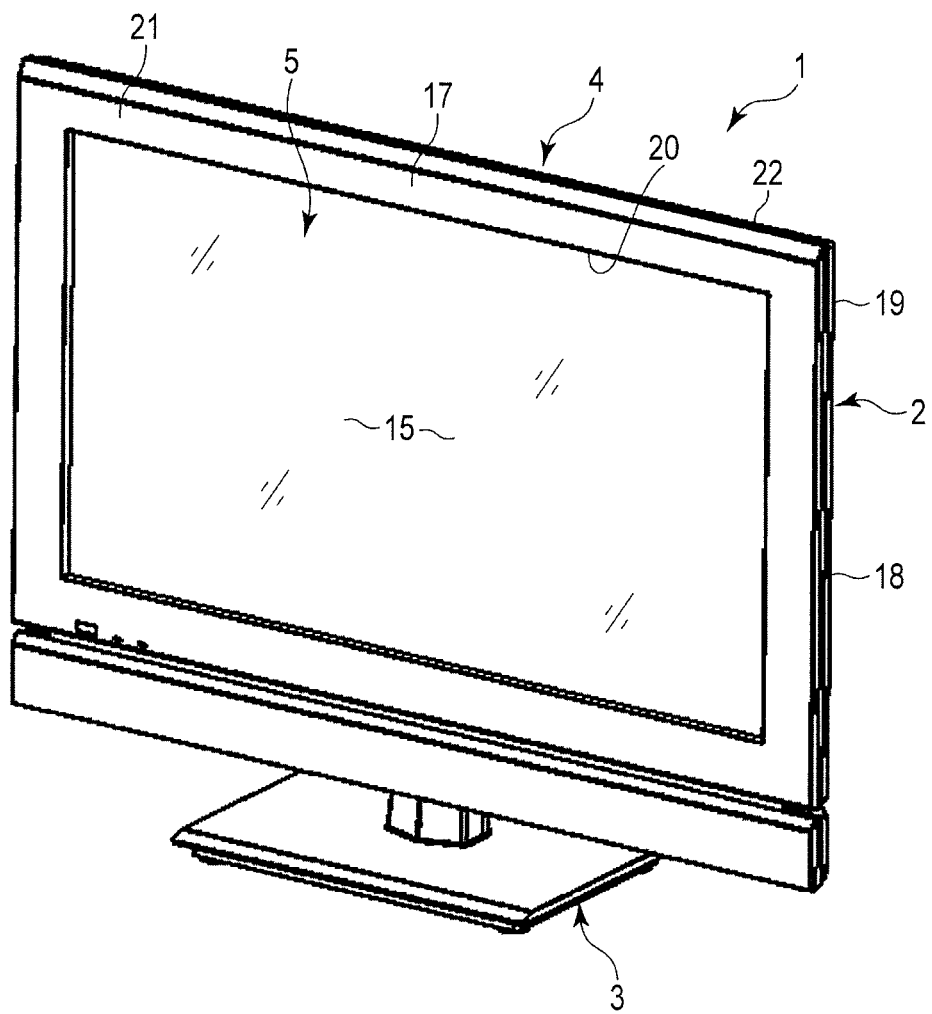
F I G. 1

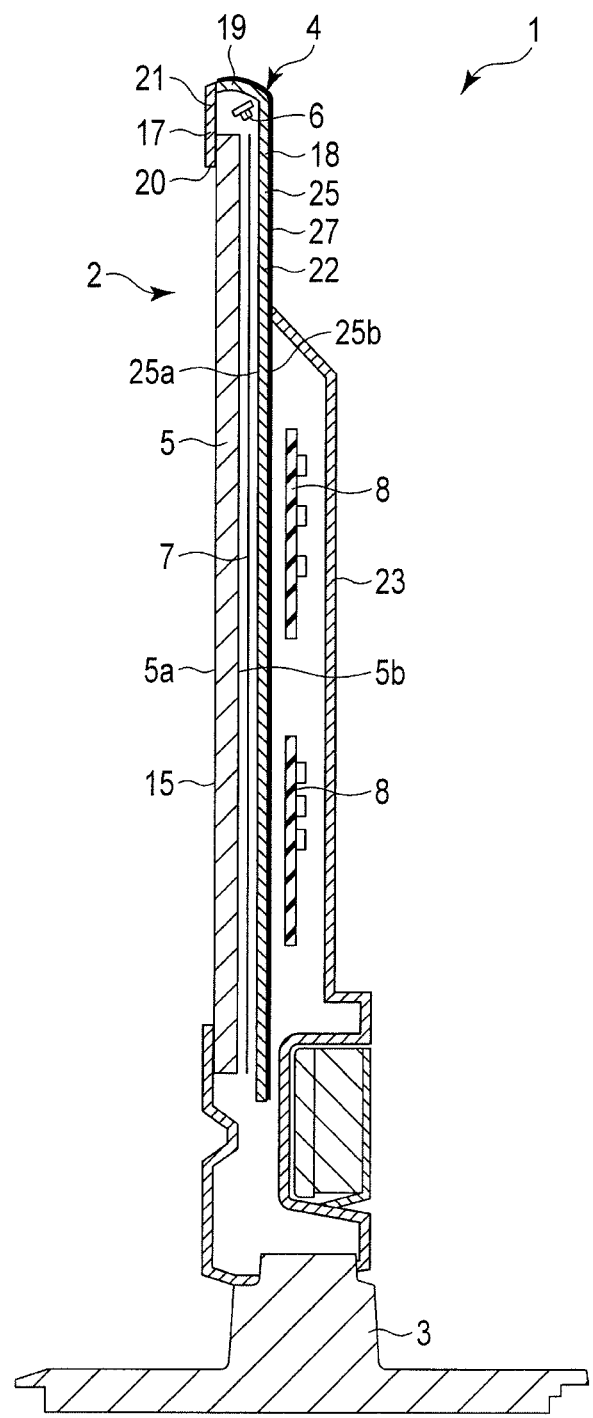
F I G. 3

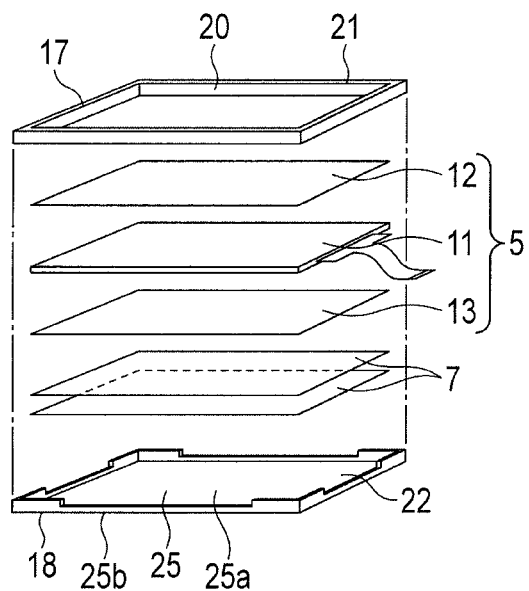
F I G. 6
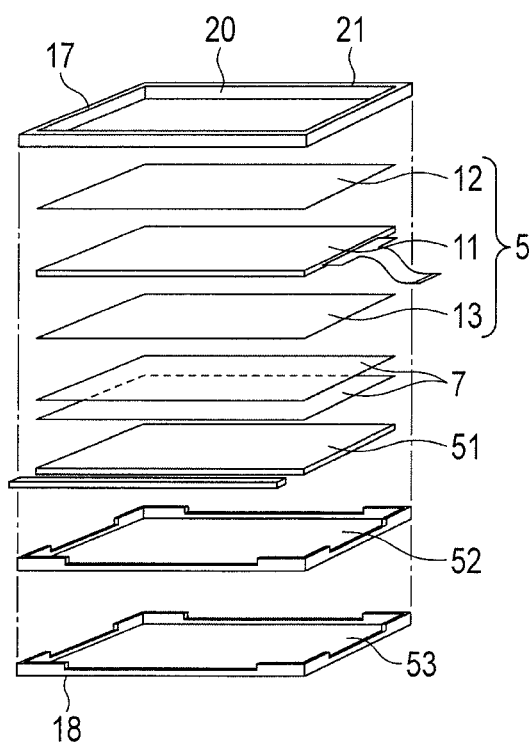
F I G. 7

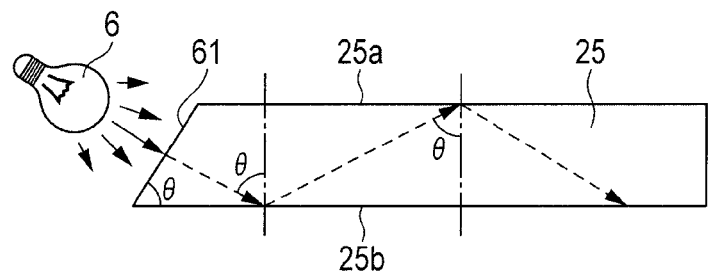
F I G. 13
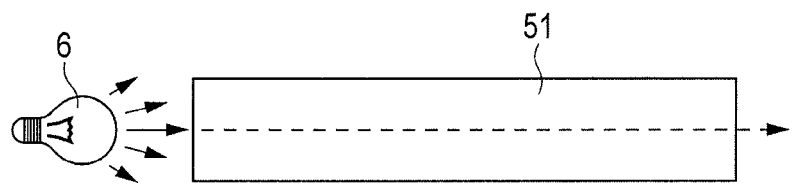
F I G. 14
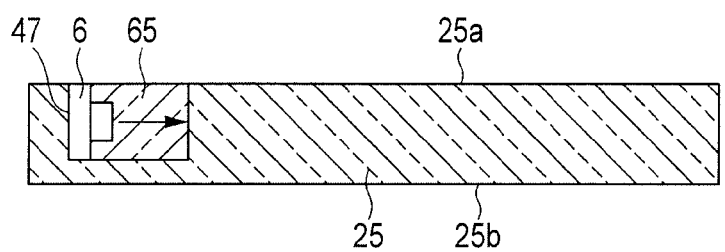
F I G. 15
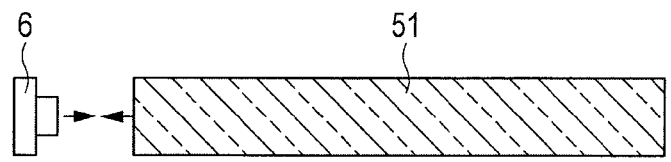
F I G. 16

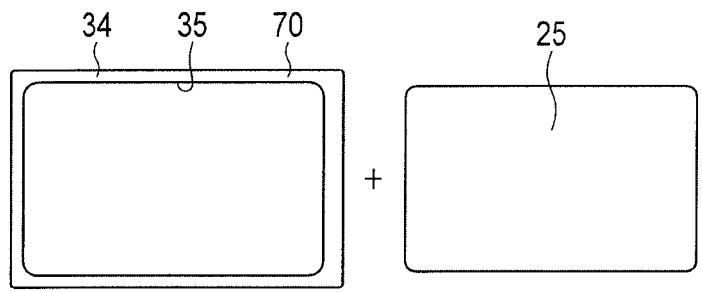
F I G. 20
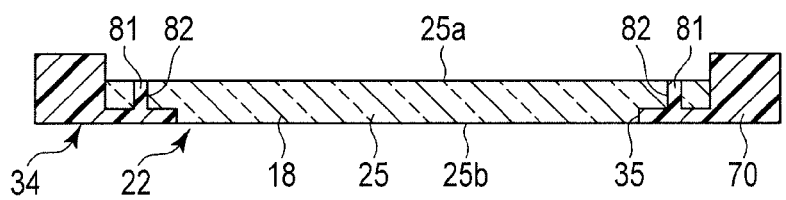
F I G. 21
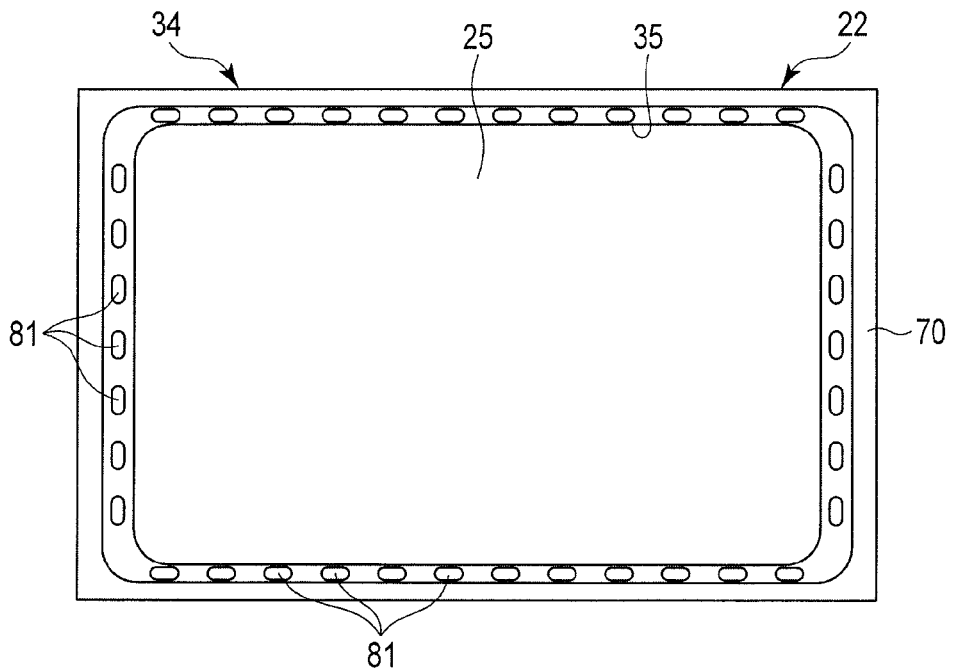
F I G. 22

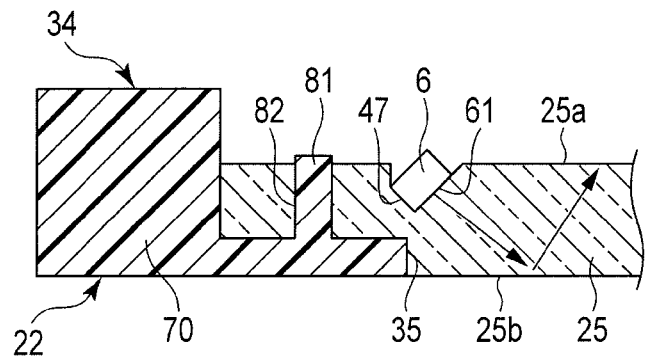
F I G. 23
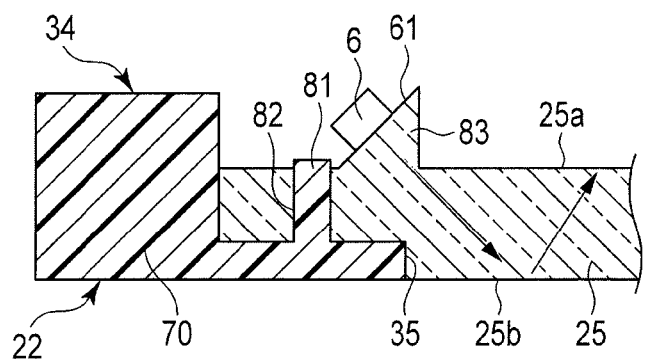
F I G. 24
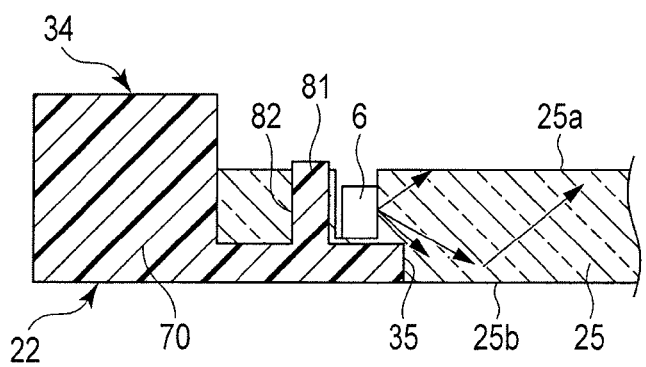
F I G. 25

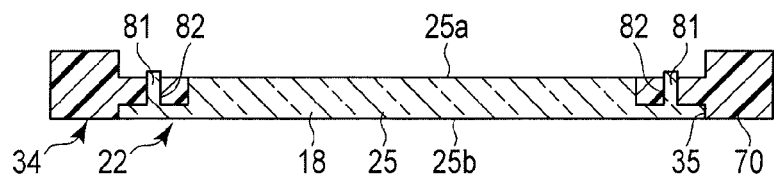
F I G. 26
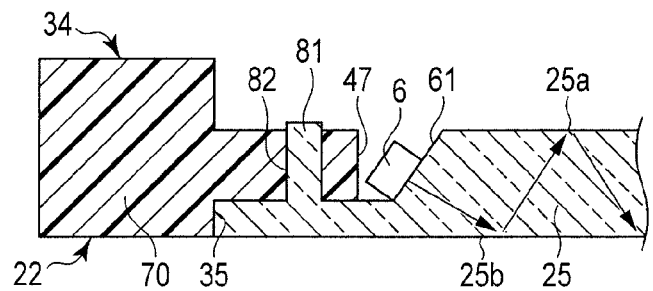
F I G. 27
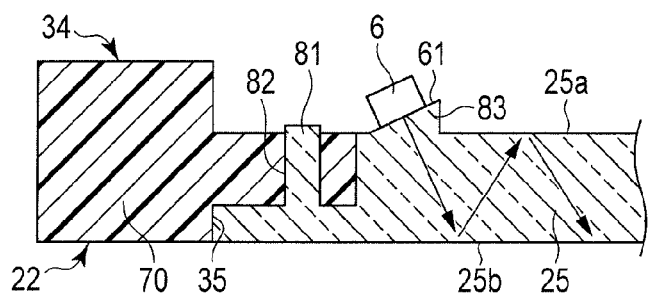
F I G. 28
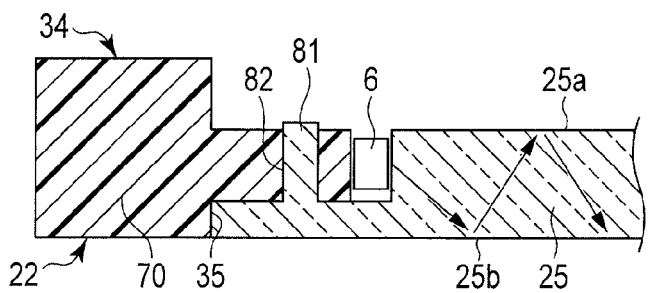
F I G. 29

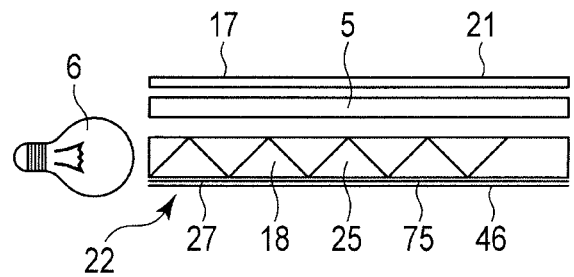
F I G. 30
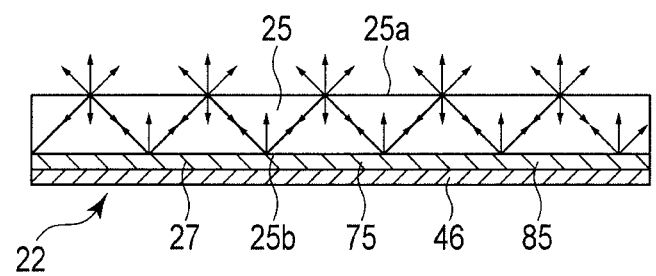
F I G. 31
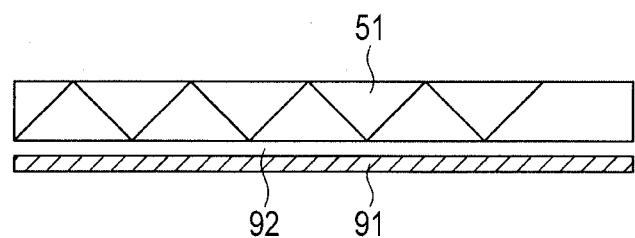
F I G. 32

TELEVISION AND ELECTRONIC APPARATUS HAVING LIGHTGUIDE INTEGRATED AS PART OF THE HOUSING AND A METHOD OF MAKING

CROSS-REFERENCE TO RELATED APPLICATIONS

This application is based upon and claims the benefit of priority from prior Japanese Patent Application No. 2011-237143, filed Oct. 28, 2011; the entire contents of which are incorporated herein by reference.

FIELD

Embodiments described herein relate generally to electronic apparatuses including televisions.

BACKGROUND

A display device of an electronic apparatus, such as a television, includes a display panel, a light source, and a light guide plate.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view of a television according to a first embodiment;

FIG. 3 is an exemplary cross-sectional view of the television illustrated in FIG. 1;

FIG. 6 is an exemplary exploded perspective view of a display unit illustrated in FIG. 5;

FIG. 7 is an exemplary exploded perspective view of a display unit related to the third embodiment;

FIG. 13 is an exemplary diagram illustrating the positional relation between a light source and a light guide portion according to the sixth embodiment;

FIG. 14 is an exemplary diagram illustrating the positional relation between a light source and a light guide plate related to the sixth embodiment;

FIG. 15 is an exemplary diagram illustrating the relation between a light source and a light guide portion according to a seventh embodiment;

FIG. 16 is an exemplary diagram illustrating the relation between a light source and a light guide plate related to the seventh embodiment;

FIG. 20 is an exemplary plan view of a cover according to a tenth embodiment;

FIG. 21 is an exemplary cross-sectional view of the cover illustrated in FIG. 20;

FIG. 22 is an exemplary plan view of the cover illustrated in FIG. 20;

FIG. 23 is an exemplary enlarged cross-sectional view of a portion of the cover illustrated in FIG. 20;

FIG. 24 is an exemplary cross-sectional view of a first modification of the cover according to the tenth embodiment;

FIG. 25 is an exemplary cross-sectional view of a second modification of the cover according to the tenth embodiment;

FIG. 26 is an exemplary cross-sectional view of a third modification of the cover according to the tenth embodiment;

FIG. 27 is an exemplary enlarged cross-sectional view of a portion of the cover illustrated in FIG. 26;

FIG. 28 is an exemplary cross-sectional view of a fourth modification of the cover according to the tenth embodiment;

FIG. 29 is an exemplary cross-sectional view of a fifth modification of the cover according to the tenth embodiment;

FIG. 30 is an exemplary diagram schematically illustrating the structure of a display unit according to an eleventh embodiment;

FIG. 31 is an exemplary cross-sectional view of the cover illustrated in FIG. 30;

FIG. 32 is an exemplary cross-sectional view of a light guide plate and a white board related to the eleventh embodiment;

DETAILED DESCRIPTION

Various embodiments will be described hereinafter with reference to the accompanying drawings.

In general, according to one embodiment, an electronic apparatus comprises a housing, a panel, and a light source. The panel comprises a display screen. The housing comprises a first wall and a second wall. The first wall comprises an opening exposing the display screen. The second wall is opposite to the first wall. Light from the light source reaches the panel through the second wall.

Hereinafter, exemplary embodiments will be described with reference to the drawings.

First Embodiment

Figure 2:
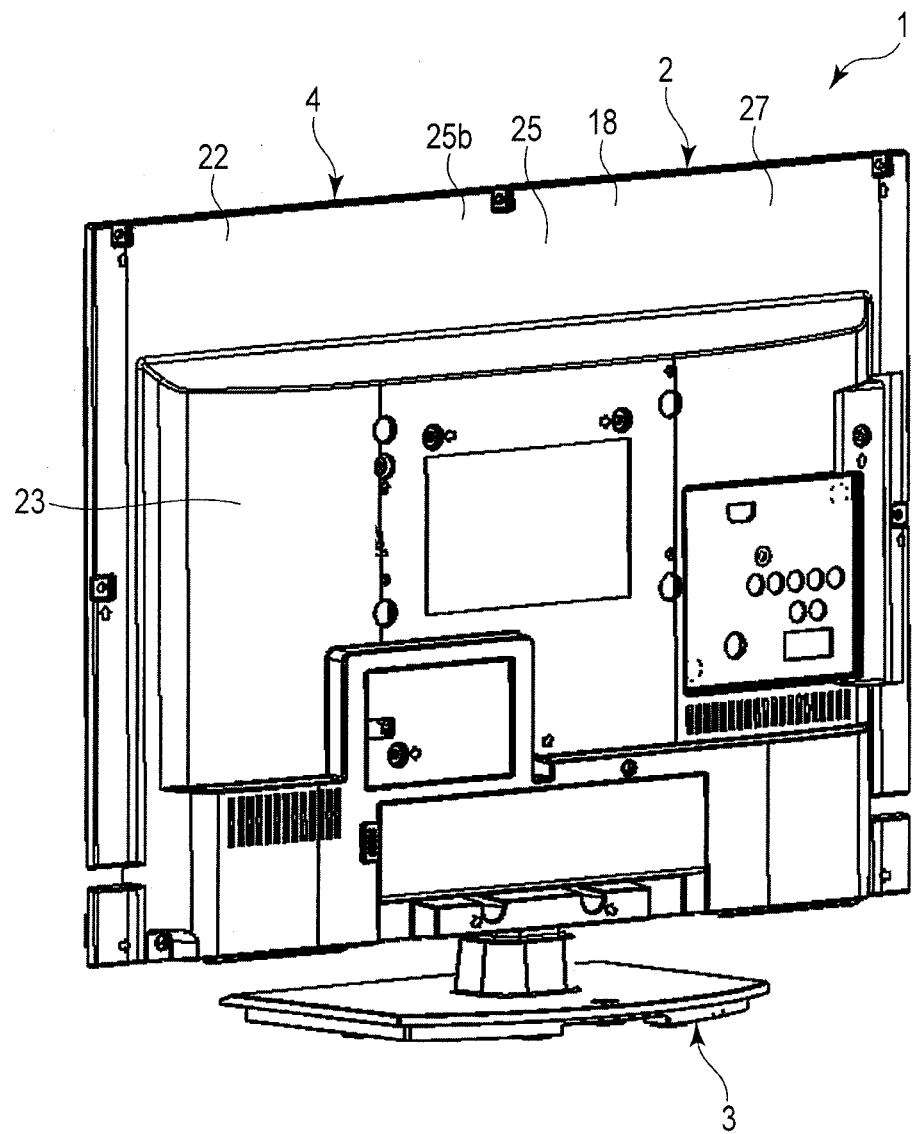
FIG. 2 is an exemplary perspective view of the television illustrated in FIG. 1, as seen from a different angle.

FIGS. 1 to 3 illustrate a television 1 according to a first embodiment. The television 1 is an example of an "electronic apparatus". As illustrated in FIG. 1, the television 1 includes a display unit 2 and a stand 3 (supporting portion) which supports the display unit 2.

As illustrated in FIG. 3, the display unit 2 includes a housing 4. The housing 4 includes a panel 5, a plurality of light-emitting diodes 6 (LEDs, i.e., LED modules), an optical sheet 7, and electronic components 8. The panel 5 is a panel cell and includes a liquid crystal substrate unit 11 and two polarizing plates 12 and 13 which are separately provided on both sides of the liquid crystal substrate unit 11 (see FIG. 6).

The liquid crystal substrate unit 11 includes, for example, two glass substrates and liquid crystal (e.g., liquid crystal layer) which is interposed between the two glass substrates. One of the two glass substrates is a color filter substrate. The other glass substrate is an array substrate.

Another example of the panel 5 is a flexible panel. In this case, the liquid crystal substrate unit 11 includes two film substrates (e.g., flexible substrates or plastic substrates) and liquid crystal (e.g., liquid crystal layer) which is interposed between the two film substrates. The example of the panel 5 is not limited thereto, but an organic EL display or various kinds of other panels may be used.

As illustrated in FIG. 3, the panel 5 includes a first surface 5a (e.g., front surface) and a second surface 5b (e.g., rear surface). The first surface 5a includes a display screen 15 on which an image or video is displayed. The second surface 5b is opposite to the first surface 5a. The second surface 5b is a light receiving surface which is illuminated by the light source. The plurality of LEDs 6 are an example of the light source (i.e., a light emitting unit, a lighting component, a luminous component, an electronic component, a component, a light, or a diode) for the panel 5.

As illustrated in FIGS. 1 to 3, the housing 4 includes a front wall 17, a rear wall 18 (i.e., back wall), and a circumferential wall 19. The front wall 17 is an example of a "first wall". The rear wall 18 is an example of a "second wall" and the circumferential wall 19 is an example of a "third wall".

The front wall 17 extends substantially in parallel to the display screen 15. An opening 20 (i.e., first opening) through which the display screen 15 of the panel 5 is exposed is provided in the front wall 17. The rear wall 18 is opposite to the front wall 17 and faces the second surface 5b of the panel 5. A portion of the rear wall 18 extends substantially in parallel to the front wall 17. The circumferential wall 19 extends in a direction crossing the front wall 17 and the rear wall 18 and connects the edge of the front wall 17 and the edge of the rear wall 18.

As illustrated in FIGS. 1 to 3, the housing 4 according to this embodiment includes a mask 21, a first cover 22 (e.g., first back cover), and a second cover 23 (e.g., second back cover). The mask 21 includes a front wall 17. The first cover 22 includes a portion of the rear wall 18 and the circumferential wall 19. The second cover 23 includes another portion of the rear wall 18.

As illustrated in FIGS. 2 and 3, the outward appearance of the first cover 22 corresponds to that of the panel 5. As illustrated in FIG. 3, a portion of the first cover 22 extends along the panel 5 (e.g., extends substantially in parallel to the panel 5). The first cover 22 according to this embodiment is a portion of the housing 4 and functions as a light guide plate. That is, in this embodiment, the light guide plate and the housing 4 are integrated with each other. Next, the first cover 22 will be described in detail below.

As illustrated in FIG. 3, at least a portion of the first cover 22 includes a light guide portion 25 (i.e., light guide) serving as a light guide plate. For example, the size of the light guide portion 25 is more than that of the panel 5. The light guide portion 25 includes an inner surface 25a (i.e., first surface) and an outer surface 25b (i.e., second surface). The inner surface 25a faces the panel 5. The outer surface 25b is opposite to the inner surface 25a and is exposed to the outside of the housing 4. The inner surface 25a of the light guide portion 25 is identical to the inner surface of the first cover 22. The outer surface 25b of the light guide portion 25 is identical to the outer surface of the first cover 22.

The first cover 22 (e.g., the light guide portion 25 or the rear wall 18) is made of a light transmissive material (e.g., a transparent member). The plurality of LEDs 6 are mounted so as to face the light guide portion 25 and emit light to the light guide portion 25. Light emitted from the plurality of LEDs 6 enters the light guide portion 25 and travels in the light guide portion 25. For example, the light guide portion 25 includes the scattering portion (e.g., scattering element) which is the same as that of a general light guide plate. That is, the light guide portion 25 includes, for example, ink dots formed by silk-screen printing or an uneven portion provided on the surface of the light guide portion 25 as the scattering portion.

The light which entered the light guide portion 25 is scattered by the scattering portion while traveling in the light guide portion 25. The scattered light is substantially uniformly emitted from the inner surface 25a of the light guide portion 25 (i.e., the inner surface of the first cover 22) to the panel 5. In this way, the panel 5 is illuminated and an image or video is displayed on the display screen 15.

As illustrated in FIG. 3, at least a portion of the outer surface 25b of the light guide portion 25 (i.e., the outer surface of the first cover 22) includes a light shielding layer 27. The light shielding layer 27 shields at least a portion of the light from the light guide portion 25 to the outside of the housing 4. In this way, light does not leak from the light guide portion 25 to the outside. The light shielding layer 27 is not particularly limited. For example, the light shielding layer 27 may be a colored (e.g., black) coated film or a metal film which is deposited or adhered.

As illustrated in FIG. 3, one or a plurality of optical sheets 7 (e.g., optical films) are provided between the panel 5 and the light guide portion 25. The optical sheet 7 is, for example, a prism sheet or a diffusion sheet. The optical sheet 7 may not be provided if it is not needed.

As illustrated in FIGS. 2 and 3, the second cover 23 is provided on the rear side of the panel 5. The second cover 23 is smaller than the panel 5. The electronic component 8 is disposed between the first cover 22 and the second cover 23. An example of the electronic component 8 is a circuit board. The example of the electronic component 8 is not limited thereto. For example, a recording medium, various kinds of modules, and various kinds of other electronic components may be used. The second cover 23 is made of metal or plastic which does not transmit light. The second cover 23 covers the electronic component 8 from the outside.

According to this structure, it is possible to reduce the thickness of the television 1.

A general electronic apparatus includes a housing, and a panel and a light guide plate which are provided separately from the housing. Therefore, the light guide plate and the rear wall of the housing are arranged on the rear side of the panel, which makes it difficult to reduce the thickness of the electronic apparatus.

In contrast, in this embodiment, a portion of the housing 4 functions as the light guide plate. Therefore, it is not necessary to provide the light guide plate separately from the housing 4. In this way, it is possible to reduce the thickness of the television 1. This will be described in detail in the following third embodiment.

Second Embodiment

Next, a television 1 according to a second embodiment will be described with reference to FIG. 4. In the second embodiment, components having the same or similar functions as those in the first embodiment are denoted by the same reference numerals and the description thereof will not be repeated. In addition, structures other than the following structures are the same as those in the first embodiment.

Figure 4:
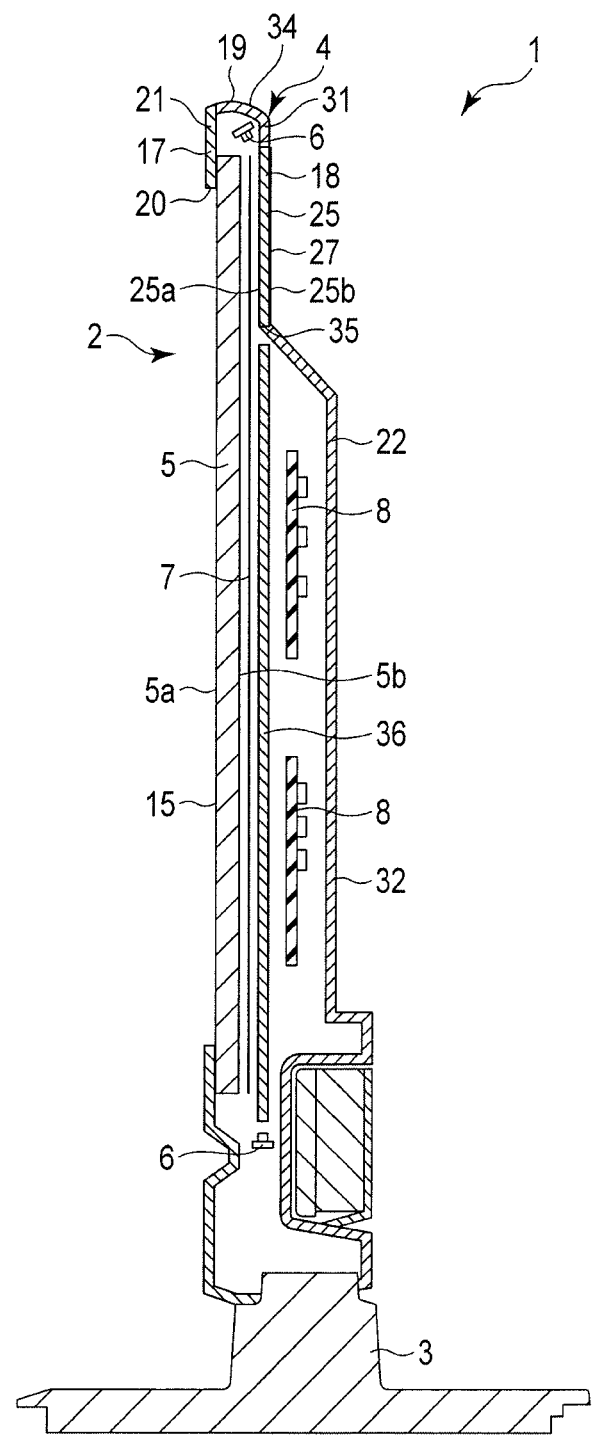
FIG. 4 is an exemplary cross-sectional view of a television according to a second embodiment.

As illustrated in FIG. 4, a housing 4 includes a mask 21 and a cover 22 (e.g., back cover). The mask 21 includes a front wall 17. The cover 22 includes a rear wall 18 and a circumferential wall 19. The cover 22 includes a first portion 31 and a second portion 32. The first portion 31 extends along a panel 5 (e.g., extends substantially in parallel to the panel 5). The second portion 32 is further away from the panel 5 than the first portion 31. An electronic component 8 (e.g., a circuit board) is provided between the second portion 32 and the panel 5.

In this embodiment, the cover 22 includes an outer frame 34 (i.e., frame) and a light guide portion 25 which is attached to the outer frame 34. The outer frame 34 is made of, for example, metal or plastic which does not transmit light. The outer frame 34 includes the first portion 31 and the second portion 32. The second portion 32 covers the electronic component 8 from the outside.

As illustrated in FIG. 4, the first portion 31 includes an opening 35 (i.e., second opening 35). The opening 35 is opposite to an opening 20 (i.e., first opening) through which a display screen 15 is exposed. The light guide portion 25 is provided in the opening 35.

An example of the light guide portion 25 is a light guide plate (i.e., light guide member). At least a portion of the light guide portion 25 is exposed to the outside through the opening 35. The "exposure through the opening" is not limited to a state in which the light guide portion 25 is exposed to the outside, but includes a state in which the light guide portion 25 is covered with the light shielding layer 27 and is exposed to the outside. In other words, the "exposure through the opening" means that a structural member which is independent (i.e., separated) from the light shielding portion is not provided outside at least a portion of the light shielding portion.

As illustrated in FIG. 4, in this embodiment, a light guide plate 36 is provided between the second portion 32 and the panel 5. In this way, an image or video is displayed on the entire display screen 15.

According to this structure, similarly to the first embodiment, it is possible to reduce the thickness of the television.

Third Embodiment

Next, an electronic apparatus 41 according to a third embodiment will be described with reference to FIGS. 5 to 9. In the third embodiment, components having the same or similar functions as those in the first and second embodiments are denoted by the same reference numerals and the description thereof will not be repeated. In addition, structures other than the following structures are the same as those in the first embodiment.

The electronic apparatus 41 according to this embodiment is, for example, a notebook portable computer (i.e., notebook PC). The electronic apparatus 41 includes a first unit 42, a second unit 43, and a hinge portion 44.

The first unit 42 is a main unit. The second unit 43 is a display unit. The first unit 42 includes a housing 42a. The housing 42a is provided with an input unit 45a (i.e., input receiving unit). An example of the input unit 45a is a keyboard. However, the input unit 45a is not limited thereto.

The housing 42a includes a circuit board 45b, which is a main board, for example, and a module 45c. An example of the module 45c is a memory device. However, the module 45c is not limited thereto. The circuit board 45b is electrically connected to the panel 5 and controls the panel 5.

The second unit 43 is rotatably (i.e., openably) connected to the rear end of the first unit 42 by the hinge portion 44. In this way, the electronic apparatus 41 can be rotated between a first state in which the first unit 42 and the second unit 43 overlap each other and a second state in which the second unit 43 is opened with respect to the first unit 42.

Figure 5:
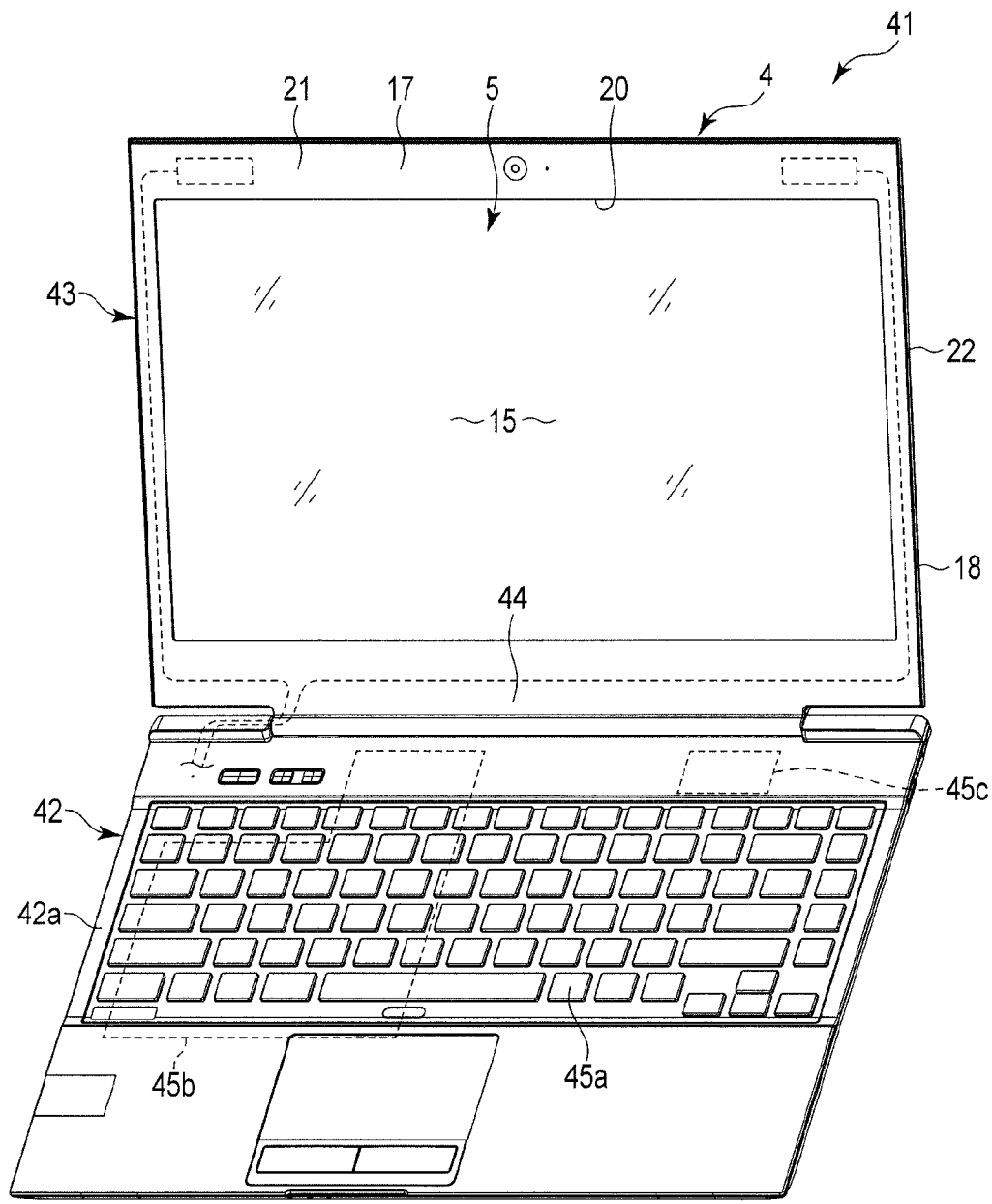
FIG. 5 is an exemplary perspective view of an electronic apparatus according to a third embodiment.

As illustrated in FIGS. 5 and 6, the second unit 43 includes a housing 4. The panel 5, a plurality of LEDs 6 (see FIG. 9), an optical sheet 7, and an electronic component 8 are accommodated in the housing 4. An example of the electronic component 8 is an antenna or an antenna cable.

As illustrated in FIG. 6, the housing 4 according to this embodiment includes a mask 21 and a cover 22. The mask 21 includes a front wall 17. The cover 22 includes a rear wall 18 and a circumferential wall 19. The cover 22 according to this embodiment is a portion of the housing 4 and functions as a light guide plate.

Figure 8:
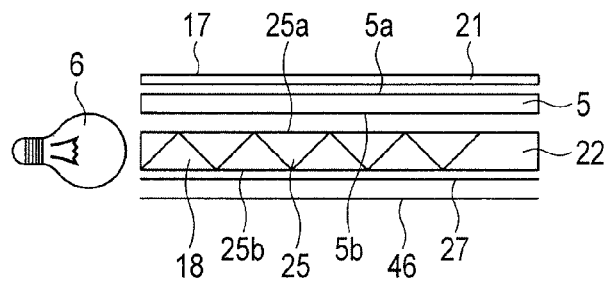
FIG. 8 is an exemplary diagram schematically illustrating the structure of the display unit illustrated in FIG. 5.

As schematically illustrated in FIG. 8, at least a portion of the cover 22 includes a light guide portion 25 serving as the light guide plate. The details of the cover 22 (i.e., light guide portion 25) are the same as those in the first embodiment. That is, the cover 22 (e.g., the light guide portion 25 and the rear wall 18) is made of a light transmissive material (e.g., a transparent member). Light from the plurality of LEDs 6 passes through the light guide portion 25 so as to be substantially uniformly emitted from the inner surface 25a of the light guide portion 25 (i.e., the inner surface of the first cover 22) to the panel 5. For example, the light guide portion 25 is provided in the entire region facing the panel 5 in the rear wall 18.

As illustrated in FIG. 8, a light shielding layer 27 is provided on at least a portion of the outer surface 25b of the light guide portion 25 (i.e., the outer surface of the cover 22). In this embodiment, the light shielding layer 27 is formed on the outer surface of the light guide portion 25 by coating or vapor deposition.

The light shielding layer 27 according to this embodiment is a reflecting layer (e.g., reflection coating) which reflects at least a portion of the light emitted from the light guide portion 25 to the outside of the housing 4. At least a portion of the light shielding layer 27 (e.g., reflecting layer) is adhered to the outer surface 25b of the light guide portion 25. That is, there is no air layer causing reflection loss between the light guide portion 25 and the light shielding layer 27 (e.g., reflecting layer).

The electronic component 8, such as an antenna, is provided around the panel 5. The electronic component 8 is not limited to the antenna, but other electronic components may be used. The electronic component 8 is covered by the light shielding layer 27 so as not to be seen from the outside. As illustrated in FIG. 8, a decorative layer 46 is provided outside the light shielding layer 27.

Figure 9:
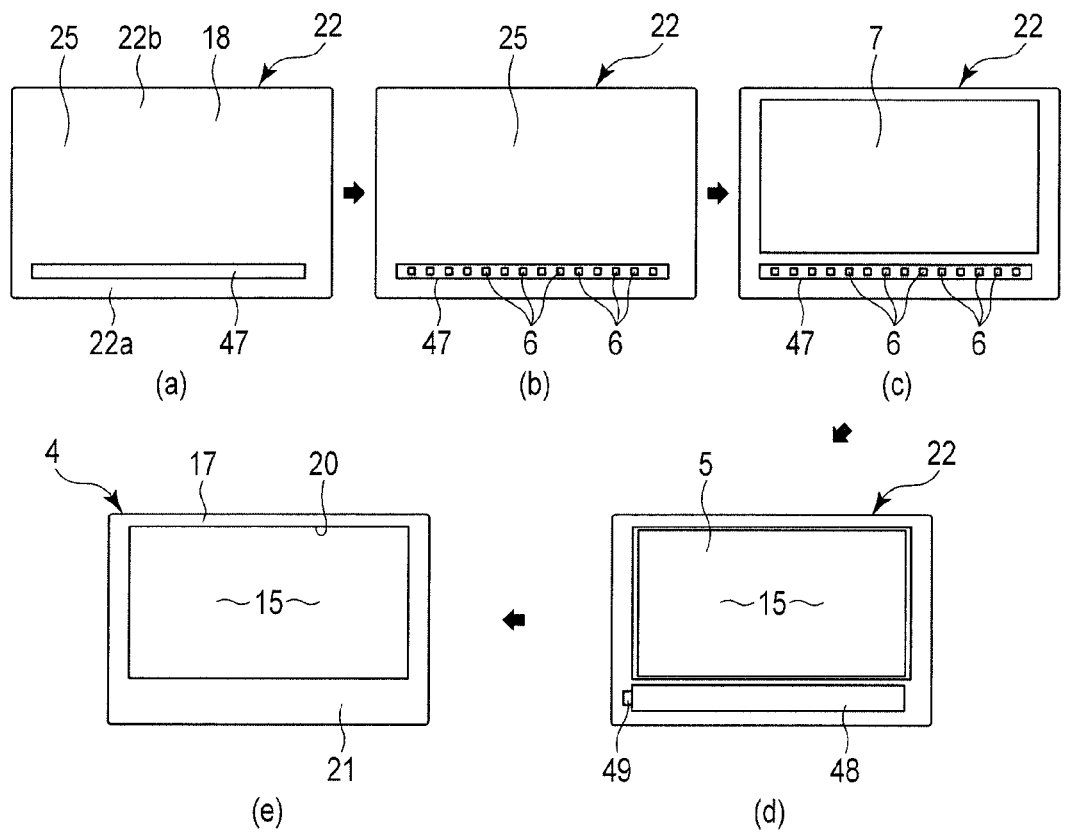
FIG. 9 is an exemplary plan view of an example of the assembly of the display unit illustrated in FIG. 5.

FIG. 9 illustrates an example of the assembly of the display unit 2. As illustrated in FIG. 9, a groove 47 (i.e., an attachment portion or an accommodating portion) which is recessed from the inner surface 25a is provided in the light guide portion 25 (e.g., cover 22). The plurality of LEDs 6 are attached to the groove 47.

The cover 22 includes a first end 22a (e.g., lower end) to which the hinge portion 44 is connected and a second end 22b (e.g., upper end) opposite to the first end 22a. The groove 47 is provided at the first end 22a and extends along the first end 22a.

The display unit is assembled as follows. First, the cover 22 is prepared (FIG. 9(a)). Then, the plurality of LEDs 6 are attached to the groove 47 of the cover 22 (FIG. 9(b)). Then, the optical sheet 7 is attached to the cover 22 (FIG. 9(c)). Then, the panel 5, a substrate module 48, and an LED flexible cable 49 are attached to the cover 22 (FIG. 9(d)). Finally, the mask 21 is attached to the cover 22 with the panel 5 interposed therebetween (FIG. 9(e)). In this way, the display unit 2 is assembled.

According to this structure, it is possible to reduce the thickness of the electronic apparatus 41.

For comparison, FIG. 7 illustrates a display unit in which a light guide plate is provided separately from a housing. As illustrated in FIG. 7, the display unit includes a mask 21, a panel 5, a light guide plate 51, a metal plate 52, and a cover 53. This structure has a limit in reducing the thickness. One of the bottlenecks is the light guide plate 51. The light guide plate guides light from the end surface to the panel of an LCD unit. The amount of light emitted to the panel depends on the thickness of the light guide plate. That is, in the case where the thickness of the light guide plate is reduced, light guide efficiency is reduced and the brightness of the screen is reduced. In the LCD unit, the light guide plate is one of the relatively thick members.

In contrast, in this embodiment, since the cover 22 has the function of the light guide plate, the light guide plate may be removed. In this way, it is possible to reduce the thickness of the electronic apparatus 41. In addition, since the light guide plate is formed as a portion of the housing 4, fixing components for attaching the light guide plate to the housing 4 may be removed. As a result, the number of components is reduced and it is possible to improve the assemblability of the electronic apparatus 41 or reduce the manufacturing costs thereof.

In many cases, the thickness (e.g., 1.25 mm to 1.75 mm) of the cover 22 is more than the thickness (e.g., 0.8 mm to 1.0 of the light guide plate. In this embodiment, since the cover 22 can be used as the light guide plate, it is possible to ensure a large incident cross-sectional area. Therefore, light guide efficiency is improved. In this way, it is possible to use a light source with low power consumption and low manufacturing costs, as compared to the light source according to the related art. This contributes to reducing the manufacturing costs of an electronic apparatus.

In the case where the light guide plate is provided separately from the housing, the light source is generally provided at the end surface of the light guide plate. Therefore, a thin light source is needed. The thin light source needs to have a small size and a high output, which causes an increase in power consumption, the amount of heat generated, and manufacturing costs.

In contrast, in this embodiment, since a portion of the housing 4 functions as the light guide plate, the light source can be provided at a position other than the end surface of the light guide plate. That is, flexibility in the position where the light source is provided increases. In this way, the limit of the thickness of the light source is reduced and it is possible to select a light source with low power consumption and low manufacturing costs. In addition, it is possible to adjust the incident angle of the light source and thus improve light guide efficiency.

In this embodiment, the LED 6 is attached to the groove 47 of the cover 22. Therefore, it is possible to further reduce the thickness of the display unit 2.

In this embodiment, the groove 47 is provided at the first end 22a of the cover 22 to which the hinge portion 44 is connected. The first end 22a is one of the portions which are less likely to receive strong force (i.e., large moment) when the second unit 43 is opened or closed with respect to the first unit 42. Since the groove 47 is provided in the portion, it is possible to further reduce the thickness of the cover 22.

In this embodiment, the reflecting layer (e.g., light shielding layer 27) is provided on the outer surface 25b of the light guide portion 25. In this way, light guided to the side opposite to the panel 5 is used without leakage. Therefore, it is possible to reduce the energy consumption of the LED 6.

Next, electronic apparatuses 41 according to fourth to fifteenth embodiments will be described. In the first to fifteenth embodiments, components having the same or similar functions are denoted by the same reference numerals and the description thereof will not be repeated. In addition, structures other than the following structures are the same as those in the third embodiment.

Fourth Embodiment

Figure 10:
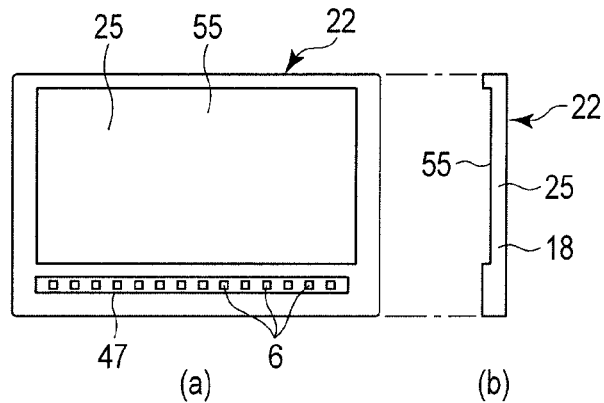
FIG. 10 is an exemplary view of a cover according to a fourth embodiment, in which (a) is an exemplary plan view of the cover, and (b) is an exemplary cross-sectional view of the cover.

FIG. 10 illustrates a cover 22 according to a fourth embodiment. As illustrated in FIG. 10, the cover 22 includes a recess 55 (e.g., step portion) corresponding to at least one of an optical sheet 7, a panel 5, and other modules. The recess 55 is provided in the inner surface of the cover 22 (i.e., the inner surface 25a of a light guide portion 25). At least one of the optical sheet 7, the panel 5, and other modules is attached to the recess 55 and is positioned by the recess 55.

According to this structure, similarly to the third embodiment, it is possible to reduce the thickness of the electronic apparatus 41. In addition, in this embodiment, since the recess 55 is provided in the cover 22, it is possible to easily position the optical sheet 7, the panel 5, and other modules during assembly. As a result, the assemblability of the electronic apparatus 41 is improved.

Fifth Embodiment

Figure 11:
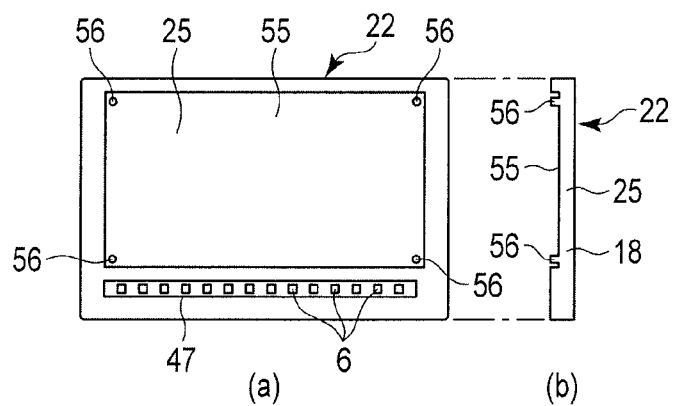
FIG. 11 is an exemplary view of a cover according to a fifth embodiment, in which (a) is an exemplary plan view of the cover, and (b) is an exemplary cross-sectional view of the cover.

FIG. 11 illustrates a cover 22 according to a fifth embodiment. As illustrated in FIG. 11, the cover 22 includes the same recess 55 as that in the fourth embodiment. In addition, the cover 22 according to this embodiment includes bosses 56 to which at least one of an optical sheet 7, a panel 5, and other modules is fitted. For example, the bosses 56 are provided at four corners of the inner surface of the cover 22 (i.e., four corners of the recess 55). At least one of the optical sheet 7, the panel 5, and other modules is attached to the bosses 56 and is positioned by the bosses 56.

According to this structure, similarly to the third embodiment, it is possible to reduce the thickness of the electronic apparatus 41. In addition, in this embodiment, since the bosses 56 are provided on the cover 22, it is possible to easily position the optical sheet 7, the panel 5, and other modules during assembly. As a result, the assemblability of the electronic apparatus 41 is improved.

Sixth Embodiment

Figure 12:
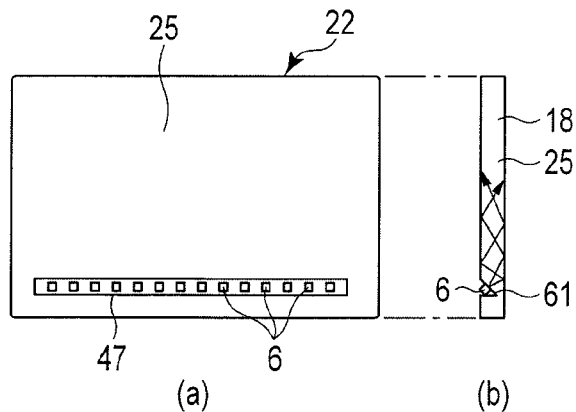
FIG. 12 is an exemplary view of a cover according to a sixth embodiment, in which (a) is an exemplary plan view of the cover, and (b) is an exemplary cross-sectional view of the cover.

FIG. 12 illustrates a cover 22 according to a sixth embodiment. As illustrated in FIG. 12, a light guide portion 25 includes an incident surface 61 (i.e., a surface) which is inclined with respect to an inner surface 25a and an outer surface 25b. A plurality of LEDs 6 are mounted so as to be inclined with respect to the inner surface 25a and the outer surface 25b. At least the center of each of the plurality of LEDs 6 is substantially vertical to the incident surface 61.

For comparison, FIG. 14 illustrates an LED 6 (i.e., light source) which is arranged substantially in parallel to a light guide plate 51. The LED 6 has a brightness distribution in which brightness increases toward the center. In the case where the light guide plate 51 is provided separately from a housing 4, the LED 6 is arranged substantially in parallel to the light guide plate 51 in order to reduce the thickness. In this case, in light emitted from the center of the LED 6, a small portion of the light is totally reflected from the light guide plate 51 and a large portion of the light passes through the light guide plate 51. Therefore, the light passing through the light guide plate 51 causes large loss. As a result, illumination efficiency is reduced.

FIG. 13 schematically illustrates the structure of this embodiment. In this embodiment, an incident surface 61 of the light guide portion 25 is formed so as to be inclined with respect to the inner surface 25a and the outer surface 25b. The LED 6 is inclined with respect to the inner surface 25a and the outer surface 25b such that light emitted from the center of the LED 6 enters the incident surface 61 in a substantially vertical direction to the surface 61.

Next, the relation between the critical angle and the incident angle will be described. A critical angle θc at which light passing through the light guide portion 25 is totally reflected from the boundary surface (e.g., the inner surface 25a or the outer surface 25b) between the light guide portion 25 and the outside is calculated by the following Expression 1 in the case where the refractive index of air is $n_1$ and the refractive index of the light guide portion 25 is $n_2$:

$$\theta c = \mathrm{Sin}^{-1}\left(\frac{n_1}{n_2}\right) \quad \text{[Expression 1]}$$

When the incident angle θ is equal to or more than the critical angle θc, light is totally reflected. As illustrated in FIG. 13, the incident angle θ is defined between a light beam and a line perpendicular to the boundary surface (e.g., the inner surface 25a or the outer surface 25b) between the light guide portion 25 and the outside.

For example, when the light guide portion 25 is made of acrylic, the critical angle θc is 42.15° since the refractive index $n_1$ of air is 1 and the refractive index $n_2$ of acrylic is 1.49. In this case, when the incident angle θ is equal to or more than 42.15°, light is totally reflected.

When the light guide portion 25 is made of glass, the critical angle θc is 41.47° since the refractive index $n_1$ of air is 1 and the refractive index $n_2$ of glass is 1.51. In this case, when the incident angle θ is equal to or more than 42.47°, light is totally reflected.

As illustrated in FIG. 13, when the incident surface 61 is inclined with respect to the inner surface 25a, it is easy to adjust the incident angle with respect to the inner surface 25a and the outer surface 25b. For example, in the case where the inner surface 25a is substantially parallel to the outer surface 25b, the angle between the incident surface 61 and the outer surface 25b is equal to the incident angle with respect to the outer surface 25b and the incident angle with respect to the inner surface 25a, from the geometric relationship.

That is, when the angle θ between the incident surface 61 and the outer surface 25b is set to be equal to or more than the critical angle θc, light emitted from the center of the LED 6 can be totally reflected and guided in the light guide portion 25. That is, the angle θ between the incident surface 61 and the outer surface 25b is changed depending on the material forming the light guide portion 25 in order to totally reflect a large number of components of the light emitted from the center of the LED 6 in the light guide portion 25.

When the incident surface 61 is inclined with respect to the inner surface 25a, it is possible to ensure the large cross-sectional area (i.e., light receiving area) of the incident surface 61, as compared to the structure in which the incident surface 61 is vertical to the inner surface 25a. When the large cross-sectional area of the incident surface 61 can be ensured, it is possible to improve light receiving efficiency.

According to this structure, similarly to the third embodiment, it is possible to reduce the thickness of the electronic apparatus 41. In addition, in this embodiment, the incident surface 61 of the light guide portion 25 is formed so as to be inclined with respect to the inner surface 25a and the outer surface 25b and the incident angle is adjusted. According to this structure, since the amount of the right which is totally reflected in the light guide portion 25 increases, light guide efficiency is improved. As a result, it is possible to improve the brightness of the screen.

Seventh Embodiment

FIG. 15 illustrates a cover 22 according to a seventh embodiment.

For comparison, FIG. 16 illustrates a structure in which an LED 6 is separate from a light guide plate 51. In this structure, there is air between the light guide plate 51 and the LED 6. Therefore, light loss occurs due to the influence of the reflection of light from the end surface by air when light emitted from the LED 6 enters the light guide plate 51. This is caused by the difference between the refractive index of air and the refractive index of the light guide plate 51. For example, when the light guide plate 51 is made of acrylic, the amount of loss is about 4%.

In contrast, as illustrated in FIG. 15, in this embodiment, a member 65 (e.g., a material or a transparent material) which transmits light fills the gap between a plurality of LEDs 6 and a light guide portion 25. That is, there is no air between the LEDs 6 and the light guide portion 25. The member 65 is, for example, transparent rubber or a transparent resin film formed by coating.

The reflective index of the material forming the member 65 is closer to that of the light guide portion 25 than the reflective index of air. As the difference between the refractive index of the member 65 and the refractive index of the light guide plate 51 is reduced, the amount of light reflected from the end surface is reduced. An example of the member is transparent rubber or silicon with a refractive index of 1.3 to 1.4.

According to this structure, similarly to the third embodiment, it is possible to reduce the thickness of the electronic apparatus 41. In addition, in this embodiment, the gap between a plurality of LEDs 6 and the light guide portion 25 is filled with a material with a refractive index close to that of the material forming the light guide portion 25. In this way, the influence of the reflection of light from the end surface is reduced and it is possible to improve light guide efficiency.

Eighth Embodiment

Figure 17:
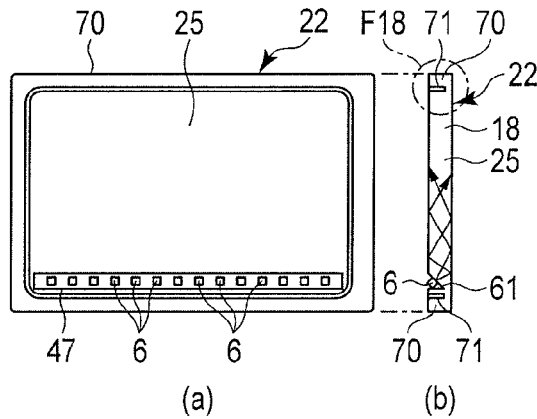
FIG. 17 is an exemplary view of a cover according to an eighth embodiment, in which (a) is an exemplary plan view of the cover, and (b) is an exemplary cross-sectional view of the cover.

FIG. 17 illustrates a cover 22 according to an eighth embodiment. As illustrated in FIG. 17, in this embodiment, the entire cover 22 is made of a light transmissive material (i.e., transparent material). The cover 22 includes a light guide portion 25 and a non-light guide portion 70. The non-light guide portion 70 is provided around a light guide portion 25 and does not face a panel 5. That is, the non-light guide portion 70 does not need to transmit light (i.e., does not emit light). An electronic component 8, such as an antenna, faces the non-light guide portion 70.

Figure 18:
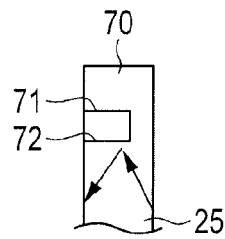
FIG. 18 is an exemplary enlarged cross-sectional view of a region of the cover surrounded by F18 in FIG. 17.

As illustrated in FIGS. 17 and 18, a groove 71 (e.g., cut-out portion) recessed from an inner surface 25a is provided between the light guide portion 25 and the non-light guide portion 70. The width of the groove 71 is, for example, 1 mm. The depth of the groove 71 may be equal to or more than, for example, half the thickness of the light guide portion 25. Air is in the groove 71. That is, an air layer with a thickness of about 1 mm is provided on the end surface of the light guide portion 25. A reflecting surface 72 which extends in the thickness direction of the light guide portion 25 is formed by the groove 71 (e.g., air layer).

As illustrated in FIG. 18, at least a portion of (e.g., most) of the light traveling in the light guide portion 25 is reflected to the center of the light guide portion 25 by the groove 71 (i.e., reflecting surface 72). In this way, it is possible to reduce the amount of light leaking to the non-light guide portion 70. In other words, the formation of the groove 71 makes it possible to provide the non-light guide portion 70 in the cover 22 made of a transparent material.

According to this structure, similarly to the third embodiment, it is possible to reduce the thickness of the electronic apparatus 41. When the cover 22 is made of a transparent member, light leaks to a portion (e.g., portion outside the panel 5) which does not need to emit light. Therefore, light guide efficiency is likely to be reduced.

However, in this embodiment, the reflecting surface 72 which suppresses the leakage of light is formed by the groove 71. In this way, it is possible to effectively transmit light to a portion which needs to emit light and thus improve light emission efficiency. When a reflecting layer (e.g., a metal layer or the light shielding layer 27) is formed on the inner surface (i.e., reflecting surface) of the groove 71 by, for example, metal vapor deposition, it is possible to increase the amount of light reflected from the end surface.

Ninth Embodiment

Figure 19:
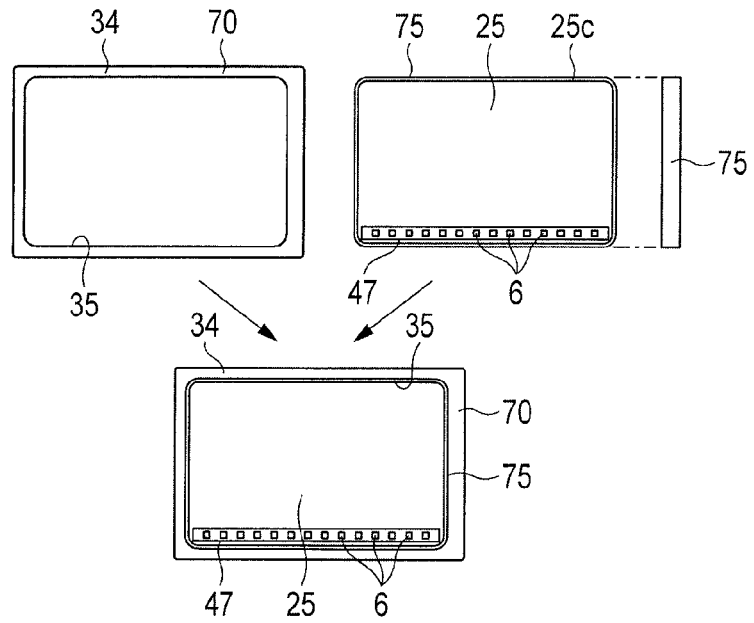
FIG. 19 is an exemplary diagram illustrating a cover according to a ninth embodiment.

FIG. 19 illustrates a cover 22 according to a ninth embodiment. As illustrated in FIG. 19, in this embodiment, the cover 22 is, for example, a double molded product (i.e., a two-stage molded product) made of two kinds of materials.

The cover 22 includes an outer frame 34 (i.e., frame) and a light guide portion 25 (e.g., a light guide member or a light guide plate). The outer frame 34 is made of a material which does not transmit light. The outer frame 34 includes a first opening 20 through which a display screen 15 is exposed and a second opening 35 opposite to the first opening 20. That is, the second opening 35 is provided in a rear wall 18 of a housing 4. The outer frame 34 forms a non-light guide portion 70. An electronic component 8, such as an antenna, faces the non-light guide portion 70.

The light guide portion 25 is attached to the outer frame 34 and is exposed to the outside of the housing 4 through the second opening 35. The light guide portion 25 includes a circumferential surface 25c which extends in a direction crossing (e.g., a direction substantially perpendicular to) an inner surface 25a and an outer surface 25b. That is, the circumferential surface 25c extends in the thickness direction of the light guide portion 25.

As illustrated in FIG. 19, a reflecting layer 75 is provided on the circumferential surface 25c of the light guide portion 25. An example of the reflecting layer 75 is a metal layer which is formed by metal vapor deposition or the attachment of metal foil. The reflecting layer 75 may be formed by, for example, coating. At least a portion of (e.g., most) of the light which travels in the light guide portion 25 is reflected to the center of the light guide portion 25 by the reflecting layer 75. In this way, it is possible to reduce the amount of light absorbed by the non-light guide portion 70.

According to this structure, similarly to the third embodiment, it is possible to reduce the thickness of the electronic apparatus 41. In addition, in this embodiment, a portion of the housing 4 is formed by the outer frame 34 which does not transmit light. Therefore, it is possible to suppress light from leaking to a region outside the panel 5. The reflecting layer 75 may not be provided.

Tenth Embodiment

FIGS. 20 to 29 illustrate a cover 22 according to a tenth embodiment. As illustrated in FIG. 20, in this embodiment, the cover 22 is formed by, for example, insert molding.

The cover 22 includes an outer frame 34 (i.e., frame) and a light guide portion 25 (e.g., a light guide member or a light guide plate). The outer frame 34 is made of a material which does not transmit light. The outer frame 34 includes a first opening 20 through which a display screen 15 is exposed and a second opening 35 opposite to the first opening 20. That is, the second opening 35 is provided in a rear wall 18 of a housing 4.

The outer frame 34 forms a non-light guide portion 70. An antenna and other electronic components 8 face the non-light guide portion 70. The light guide portion 25 is attached to the outer frame 34 and is exposed to the outside of the housing 4 through the second opening 35. A reflecting layer 75 may be provided on a circumferential surface 25c of the light guide portion 25.

As illustrated in FIGS. 21 and 22, the outer frame 34 includes, for example, welding pins 81. The light guide portion 25 includes holes 82 into which the welding pins 81 are inserted. The welding pins 81 are inserted into the holes 82 and the heads of the welding pins 81 are crushed. In this way, the light guide portion 25 is fixed to the outer frame 34 so as not to come off from the outer frame 34.

As illustrated in FIG. 23, an example of the light guide portion 25 comprises a groove 47 to which an LED 6 is attached. The light guide portion 25 includes an incident surface 61 which is inclined with respect to the inner surface 25a and the outer surface 25b. At least the center of the LED 6 faces the incident surface 61.

FIG. 24 illustrates a first modification of this embodiment. As illustrated in FIG. 24, a light guide portion 25 may include an attachment portion 83 which protrudes from an inner surface 25a. The light guide portion 25 includes an incident surface 61 which is inclined with respect to the inner surface 25a and the outer surface 25b. At least the center of the LED 6 faces the incident surface 61.

FIG. 25 illustrates a second modification of this embodiment. As illustrated in FIG. 25, an example of a light guide portion 25 includes a groove 71 to which an LED 6 is attached. At least the center of the LED 6 faces the direction which is substantially parallel to the inner surface 25a.

FIGS. 26 and 27 illustrate a third modification of this embodiment. As illustrated in FIG. 26, in this modification, a light guide portion 25 includes welding pins 81. An outer frame 34 includes holes 82 into which the welding pins 81 are inserted.

As illustrated in FIG. 27, the light guide portion 25 includes an incident surface 61 which is inclined with respect to an inner surface 25a and an outer surface 25b. At least the center of an LED 6 faces the incident surface 61.

FIG. 28 illustrates a fourth modification of this embodiment. As illustrated in FIG. 28, a light guide portion 25 includes an attachment portion 83 which protrudes from an inner surface 25a. The light guide portion 25 includes an incident surface 61 which is inclined with respect to the inner surface 25a and the outer surface 25b. At least the center of the LED 6 faces the incident surface 61.

FIG. 29 illustrates a fifth modification of this embodiment. As illustrated in FIG. 29, At least the center of the LED 6 faces the direction which is substantially parallel to an inner surface 25a.

According to this structure, similarly to the third embodiment, it is possible to reduce the thickness of the electronic apparatus 41. In addition, in this embodiment, the outer frame 34 which does not transmit light forms a portion of the housing 4. Therefore, it is possible to suppress light from leaking to a region outside the panel 5.

Eleventh Embodiment

FIGS. 30 and 31 illustrate a cover 22 according to an eleventh embodiment. The cover 22 includes a reflecting layer 75 (i.e., light shielding layer 27). The reflecting layer 75 is closely adhered to an outer surface 25b of the light guide portion 25 and reflects at least a portion of the light emitted from the light guide portion 25 to the outside of a housing 4. There is no air layer between the light guide portion 25 and the reflecting layer 75.

In this embodiment, at least a portion of the reflecting layer 75 is a conductive layer 85 (e.g., a conductive film, a metal layer, or a metal film) which is provided on the outer surface 25b of the light guide portion 25. The conductive layer 85 is provided by vapor deposition with, for example, a metal material, such as aluminum. The method of forming the conductive layer 85 is not limited to vapor deposition, but the conductive layer 85 may be formed by attaching, for example, metal foil to the outer surface 25b of the light guide portion 25. For example, the conductive layer 85 functions as an electromagnetic interference (EMI) suppressing conductive layer. That is, the conductive layer 85 suppresses the unnecessary electric wave of light from the housing 4 to the outside.

According to this structure, similarly to the third embodiment, it is possible to reduce the thickness of the electronic apparatus 41.

For comparison, FIG. 32 illustrates a structure including a light guide plate 51 and a white board 91. As illustrated in FIG. 32, there is an air layer 92 between the light guide plate 51 and the white board 91. Light which is scattered to the side opposite to a panel 5 by a scattering portion passes through the air layer 92 and is then reflected to the panel 5 by the white board 91. However, a large number of light components leak from the light guide plate 51 to the air layer 92 and light passes through the air layer 92. Therefore, a large amount of light is lost due to the reflection of light from the end surface and the low reflectance of the white board 91.

In contrast, in this embodiment, the reflecting layer 75 is closely adhered to the outer surface 25b of the light guide portion 25 and there is no air layer between the light guide portion 25 and the reflecting layer 75. Therefore, no light component leaks from the light guide portion 25 to the air layer and the reflection of light from the end surface does not occur in the air layer. As a result, it is possible to improve light guide efficiency.

Furthermore, in this embodiment, the reflecting layer 75 is a metal layer with a reflectance higher than that of the white board 91. Therefore, it is possible to improve reflection efficiency and thus improve light use efficiency.

In addition, in this embodiment, the metal vapor-deposited film for suppressing EMI forms the reflecting layer 75. That is, a function of suppressing EMI and the reflection function of the light guide portion 25 are achieved by one reflecting layer 75. The light transmittance of the reflecting layer 75 (i.e., light shielding layer 27) can be changed by adjusting the thickness of the reflecting layer 75. That is, the thickness of the reflecting layer 75 can be adjusted such that a portion of light passes through the reflecting layer 75. In this way, it is possible to achieve light decoration. In addition, the thickness of the reflecting layer 75 can be partially changed to adjust a brightness portion.

Twelfth Embodiment

Figure 33:
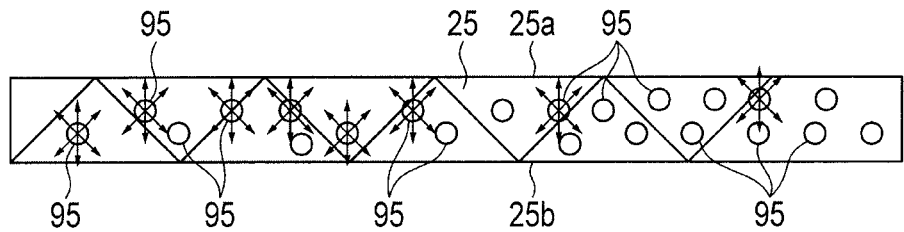
FIG. 33 is an exemplary cross-sectional view of a cover according to a twelfth embodiment.
Figure 34:
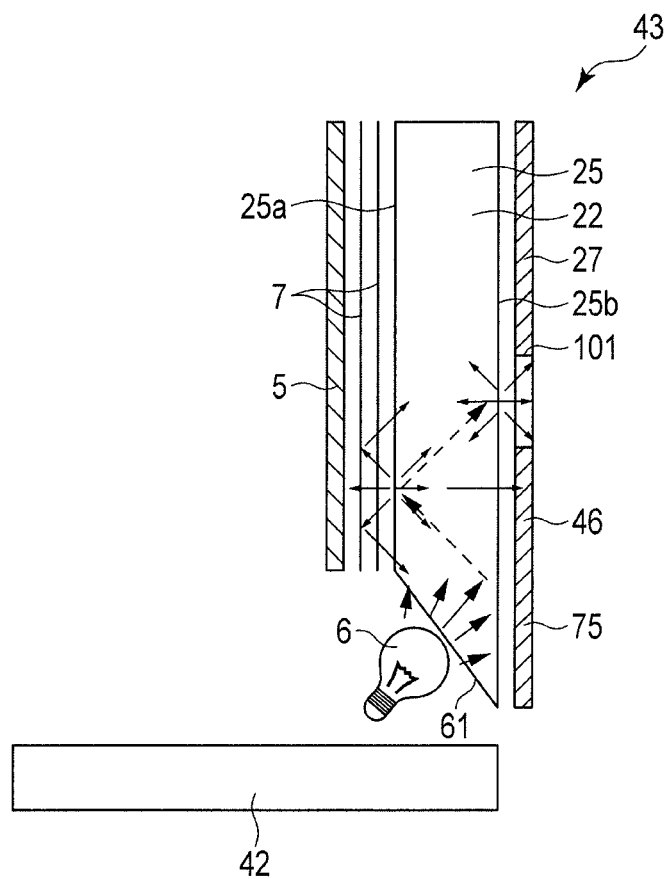
FIG. 34 is an exemplary cross-sectional view of a display unit according to a thirteenth embodiment.

FIG. 33 illustrates a cover 22 according to a twelfth embodiment. In this embodiment, a light guide portion 25 includes fine particles 95 (e.g., microparticles) for obtaining a scattered light effect. That is, the cover 22 is formed by molding a resin material including the fine particles 95.

As illustrated in FIG. 33, light which travels in the light guide portion 25 while being totally reflected is scattered by the fine particles 95. The scattered light is used to illuminate the panel 5. The concentration or distribution of the fine particles 95 can be changed to adjust a brightness distribution. In addition, when a metal particle which absorbs a specific radio wave is used as the fine particle 95, it is possible to achieve both a function of scattering light and a function of suppressing EMI.

According to this structure, similarly to the third embodiment, it is possible to reduce the thickness of the electronic apparatus 41. In general light guide plate, in order to scatter light, ink dots are provided by silk-screen printing or an uneven portion is molded thereon. The ink dot or the uneven portion is formed after the base of the light guide plate is formed.

In contrast, in this embodiment, the fine particles 95 for scattering light are mixed with the material forming the cover 22. Therefore, it is not necessary to provide the ink dot or the uneven portion in the subsequent process. In this way, it is possible to improve manufacturability.

Thirteenth Embodiment

FIGS. 34 to 37 illustrate a cover 22 according to a thirteenth embodiment. In this embodiment, an opening 101 (i.e., light transmitting portion) through which light passes is provided in a portion of a light shielding layer 27 (e.g., a decorative layer 46 or a reflecting layer 75) on an outer surface 25b of the cover 22. In this way, a portion of light passing through the light guide portion 25 is emitted from the outer surface 25b of the cover 22 to the outside of the housing 4. Therefore, it is possible to achieve the light decoration of the cover 22 and improve decorativeness.

Specifically, light passing through the light guide portion 25 is scattered in the light guide portion 25 and a portion of the light travels to the outer surface 25b of the light guide portion 25. A portion of the light emitted from the inner surface 25a of the light guide portion 25 is reflected from the optical sheet 7 and a portion of the reflected light travels to the outer surface 25b of the light guide portion 25.

In this embodiment, the opening 101 through which light passes is provided in a portion of the light shielding layer 27 on the outer surface 25b of the cover 22. In other words, the light shielding layer 27 (e.g., the decorative layer 46 or the reflecting layer 75) is provided on the outer surface 25b of the cover 22 by, for example, coating, IMF, or INR such that the opening 101 remains. Therefore, light traveling to the outer surface 25b is emitted from the opening 101 to the outside of the housing 4. In this way, a lighting portion corresponding to the shape of the opening 101 is provided on the rear wall 18 of the housing 4.

Figure 35:
FIG. 35 is an exemplary rear view of a first aspect of the cover illustrated in FIG. 34.
Figure 36:
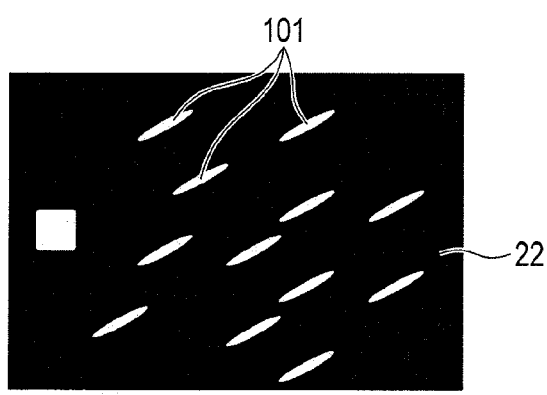
FIG. 36 is an exemplary rear view of a second aspect of the cover illustrated in FIG. 34.
Figure 37:
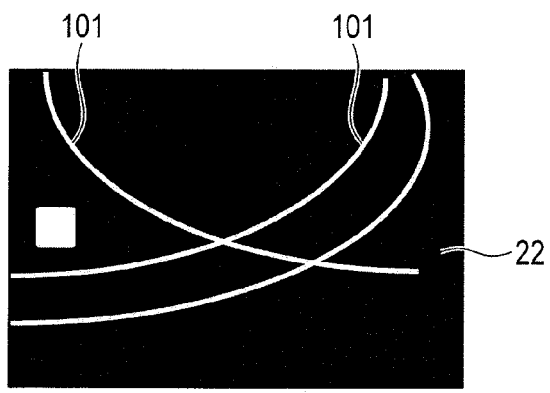
FIG. 37 is an exemplary rear view of a third aspect of the cover illustrated in FIG. 34.

As illustrated in FIGS. 35 to 37, the opening 101 may have the shape of a character, a symbol, a figure, or a mark. In this way, a lighting portion corresponding to the shape of a character, a symbol, a figure, or a mark is achieved.

According to this structure, similarly to the third embodiment, it is possible to reduce the thickness of the electronic apparatus 41. For example, in a structure in which a light guide plate is provided separately from a housing, it is necessary to partially provide transparent parts on the rear wall of the housing in order to emit light from the rear surface of the housing.

In contrast, in this embodiment, since the cover 22 emits light, it is not necessary to separately provide the transparent parts on the rear wall 18 of the housing 4. Therefore, it is possible to achieve the light decoration of the housing 4 at low costs.

Fourteenth Embodiment

Figure 38:
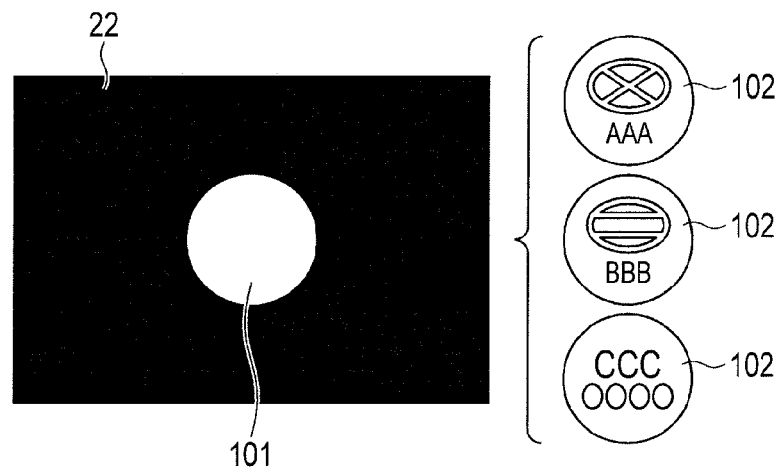
FIG. 38 is an exemplary rear view of a cover according to a fourteenth embodiment.

FIG. 38 illustrates a cover 22 according to a fourteenth embodiment. In this embodiment, an opening 101 (i.e., light transmitting portion) through which light passes is provided in a portion of a light shielding layer 27 (e.g., a decorative layer 46 or a reflecting layer 75) on an outer surface 25b of the cover 22. A sheet member 102 is attached (e.g., adhered) to the outer surface 25b of the cover 22. The sheet member 102 includes a design, such as a company logo, a specific mark, or the like. The sheet member 102 covers the opening 101. Light emitted from the opening 101 makes the design of the sheet member 102 emerge. The sheet member 102 is, for example, a seal or a film.

According to this structure, similarly to the third embodiment, it is possible to reduce the thickness of the electronic apparatus 41. According to this embodiment, it is possible to achieve the light decoration of a company logo or other designs at low costs, without separately providing transparent parts.

Fifteenth Embodiment

Figure 39:
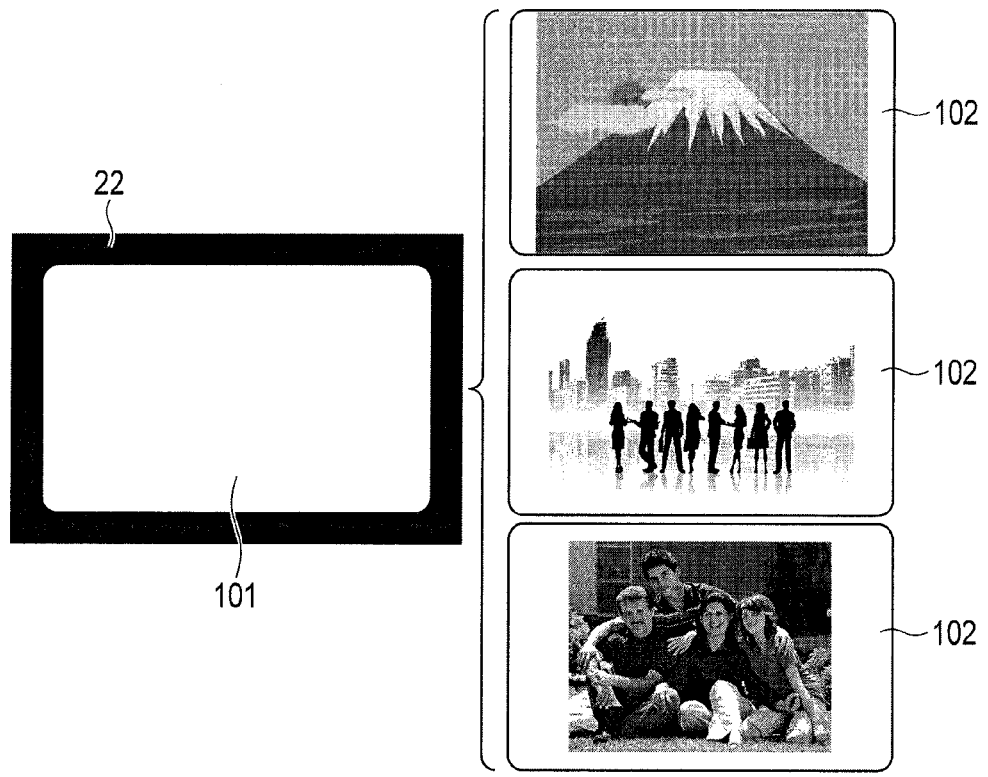
FIG. 39 is an exemplary rear view of a cover according to a fifteenth embodiment.

FIG. 39 illustrates a cover 22 according to a fifteenth embodiment. In this embodiment, an opening 101 (i.e., light transmitting portion) through which light passes is provided in a portion of a light shielding layer 27 (e.g., a decorative layer 46 or a reflecting layer 75) on an outer surface 25b of the cover 22. A sheet member 102 is attached (e.g., adhered) to the outer surface 25b of the cover 22. The sheet member 102 covers the opening 101. The sheet member 102 is, for example, a transparent film or a transparent seal on which a client or a general user can print images using an ink-jet printer on the market.

The client or the general user can purchase a product, print a favorite design on the sheet member 102, and attach the sheet member 102 to the cover 22. Light emitted from the opening 101 makes the design of the sheet member 102 emerge.

According to this structure, similarly to the third embodiment, it is possible to reduce the thickness of the electronic apparatus 41. According to this embodiment, the client or the user can freely select the design of the sheet member 102. Therefore, it is possible to improve flexibility in the selection of the design by the user. According to this structure, it is possible to achieve the electronic apparatus 41 capable of displaying a client's company logo or a user's favorite design with light.

Sixteenth Embodiment

Figure 40:
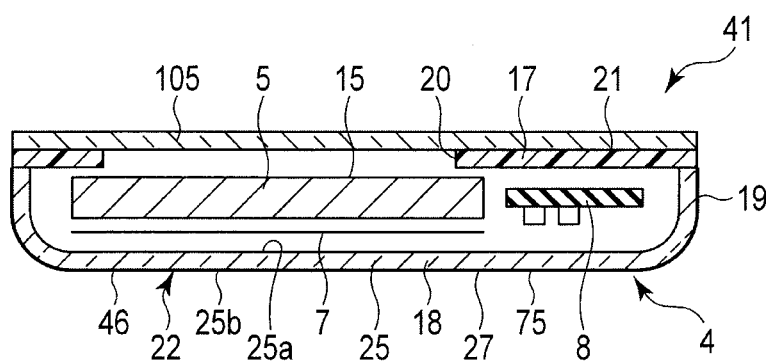
FIG. 40 is an exemplary cross-sectional view of an electronic apparatus according to a sixteenth embodiment.

FIG. 40 illustrates an electronic apparatus 41 according to a sixteenth embodiment. In this embodiment, a panel 5 and an electronic component 8 do not overlap each other in the thickness direction of a housing 4. The panel 5 and the electronic component 8 are arranged in a direction that is substantially in parallel to a display screen 15. A glass member 105 is attached to a front wall 17 of the housing 4. The glass member 105 is provided substantially over the entire front wall 17.

According to this structure, similarly to the third embodiment, it is possible to reduce the thickness of the electronic apparatus 41. According to this embodiment, since the panel 5 and the electronic component 8 do not overlap each other in the thickness direction of the housing 4, it is possible to improve flexibility in the shape of a light guide portion 25 (a cover 22 or a rear wall 18). When the glass member 105 is attached to the front wall 17, the glass member 105 can reinforce the housing 4.

The embodiments are not limited to the above-described embodiments, but the components according to the above-described embodiments may be changed without departing from the scope and spirit of the invention. In addition, a plurality of components according to the above-described embodiments may be appropriately combined with each other to form various structures. For example, some of the components according to the above-described embodiments may be removed. Components according to different embodiments may be appropriately combined with each other.

The electronic apparatus to which the first to sixteenth embodiments can be applied is not limited to the notebook PC. For example, the above-described embodiments can be widely applied to mobile phones including smart phones, slate PCs (tablet terminals), televisions, and other electronic apparatuses. In all of the first to sixteenth embodiments, the light shielding layer 27, the decorative layer 46, the reflecting layer 75, and the conductive layer 85 may be provided on the outer surface 25b of the light guide portion 25.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a panel comprising a display screen;
a light-emitting diode;
a housing comprising the panel, the light-emitting diode, a first wall, and a second wall, the first wall comprising a first opening exposing the display screen, the second wall opposite to the first wall; and
an optical sheet between the panel and the second wall,
wherein at least a portion of the second wall comprises a light guide, the light guide comprising an inner surface facing the panel and an outer surface opposite to the inner surface, the light guide further comprising a light transmissive material, the inner surface configured to transmit light from the light-emitting diode to the panel,
wherein at least a portion of the outer surface comprises a light shielding layer configured to shield at least a portion of the light from the light guide, and
wherein the light shielding layer comprises an opening through which light from the light guide passes, the opening having a shape of a character, a symbol, a figure, or a mark.

2. The electronic apparatus of claim 1,
wherein the inner surface comprises a groove, and
wherein the light-emitting diode is attached to the groove.

3. The electronic apparatus of claim 1,
wherein the light guide comprises a surface inclined with respect to the inner surface, and
wherein the light-emitting diode is inclined with respect to the inner surface and faces the inclined surface.

4. The electronic apparatus of claim 1, further comprising:
a member between the light-emitting diode and the light guide, the member comprising a refractive index closer to a refractive index of the light guide than to a refractive index of air.

5. The electronic apparatus of claim 1,
wherein at least a portion of the light shielding layer comprises a reflecting layer on the outer surface, the reflecting layer configured to reflect light from the light guide.

6. The electronic apparatus of claim 1,
wherein at least a portion of the light shielding layer comprises a conductive layer, the conductive layer configured to suppress radiation of one or more electric waves from an inside of the housing.

7. An electronic apparatus comprising:
a panel comprising a display screen;
a light-emitting diode;
a housing comprising the panel, the light-emitting diode, a first wall, and a second wall, the first wall comprising a first opening exposing the display screen, the second wall opposite the first wall; and
an optical sheet between the panel and the second wall,
an electronic component in the housing,
wherein the housing comprises a non-light guide portion, the non-light guide portion facing the electronic component,
wherein at least a portion of the second wall comprises a light guide, the light guide comprising an inner surface facing the panel and an outer surface opposite to the inner surface, the light guide further comprising a light transmissive material the inner surface configured to transmit light from the light-emitting diode to the panel, and
wherein at least a portion of the outer surface comprises a light shielding layer configured to shield at least a portion of the light from the light guide.

8. The electronic apparatus of claim 7,
wherein the housing further comprises a mask comprising the first wall and a cover comprising the second wall, and
wherein the cover is made of a light transmissive material, the cover comprising a groove between the light guide and the non-light guide portion, the groove configured to reflect at least a portion of light from the light guide.

9. The electronic apparatus of claim 7,
wherein the housing further comprises a frame and a light guide member, the frame configured to not transmit light and comprises a second opening, the second opening opposite to the first opening, and the light guide member attached to the frame and exposed to the outside through the second opening.

10. The television of claim 8,
wherein the housing further comprises a frame and a light guide member, the frame configured to not transmit light and comprises a second opening, the second opening opposite to the first opening, and the light guide member attached to the frame and exposed to the outside through the second opening.

11. An electronic apparatus comprising:
a panel comprising a display screen;
a light source;
an electronic component; and
a housing configured to accommodate the panel, the light source and the electronic component, the housing comprising a first wall and a second wall, the first wall comprising a first opening exposing the display screen, and the second wall comprising an inner surface facing the panel and an outer surface opposite to the inner surface, the first wall and the second wall forming an outer shape of the housing in combination, wherein
the second wall comprises a light guide and a non-light guide portion, at least a portion of the light guide comprising a light transmissive material to pass light from the light source therethrough and to transmit the light from the inner surface to the panel, and the non-light guide portion provided around the light guide and facing the electronic component, and
at least a portion of the outer surface of the second wall comprises a light shielding layer configured to shield at least a portion of the light from the light guide to an outside of the housing.

12. The electronic apparatus of claim 11, wherein at least a portion of the light shielding layer comprises a light transmitting portion through which light from the light guide passes, the light transmitting portion having a desired shape.

13. The electronic apparatus of claim 11, wherein the housing further comprises a mask comprising the first wall and a cover comprising the second wall, the cover comprising a light transmissive material, the cover further comprising a groove between the light guide and the non-light guide portion, the groove configured to reflect at least a portion of light from the light guide.

14. The electronic apparatus of claim 11, wherein the light guide comprises an inner groove recessed in the inner surface, the inner groove configured to accommodate the light source.

15. The electronic apparatus of claim 11, wherein the light guide comprises an incident surface inclined with respect to the inner surface, the light source is mounted inclining to the inner surface, and a center of the light source faces the incident surface.

16. The electronic apparatus of claim 11, further comprising a member filling in a gap between the light source and the light guide, the member comprising a refractive index closer to a refractive index of the light guide than to a refractive index of air.

17. The electronic apparatus of claim 11, wherein at least a portion of the light shielding layer comprises a reflecting layer on the outer surface, the reflecting layer configured to reflect light from the light guide.

18. The electronic apparatus of claim 11, wherein at least a portion of the light shielding layer comprises a conductive layer, the conductive layer configured to suppress unnecessary radiation of an electric wave from an inside of the housing.

19. The electronic apparatus of claim 13, further comprising an optical sheet between the panel and the second wall.

20. An electronic apparatus comprising:
a panel comprising a display screen;
a light source; and
a housing configured to accommodate the panel and the light source, the housing comprising a first wall and a second wall, the first wall comprising a first opening exposing the display screen, and the second wall comprising an inner surface facing the panel and an outer surface opposite to the inner surface, the first wall and the second wall forming an outer shape of the housing in combination, wherein
at least a portion of the second wall comprises a light guide, the light guide comprising a light transmissive material to pass light from the light source therethrough and to transmit the light from the inner surface to the panel, and
the outer surface of the second wall comprises a light shielding layer configured to shield at least a portion of the light from the light guide to the outside of the housing, at least a portion of the outer surface of the second wall comprising an opening having a desired shape through which light from the light guide passes.

21. The electronic apparatus of claim 20, wherein the light guide comprises an inner groove recessed in the inner surface, the inner groove configured to accommodate the light source.

22. The electronic apparatus of claim 20, wherein the light guide comprises an incident surface inclined with respect to the inner surface, the light source is mounted inclining to the inner surface, and a center of the light source faces the incident surface.

23. The electronic apparatus of claim 20, further comprising a member filling in a gap between the light source and the light guide, the member comprising a refractive index closer to a refractive index of the light guide than to a refractive index of air.

24. The electronic apparatus of claim 20, wherein at least a portion of the light shielding layer comprises a reflecting layer on the outer surface, the reflecting layer configured to reflect light from the light guide.

25. The electronic apparatus of claim 20, wherein at least a portion of the light shielding layer comprises a conductive layer, the conductive layer configured to suppress unnecessary radiation of an electric wave from an inside of the housing.

26. The electronic apparatus of claim 20, further comprising an optical sheet between the panel and the second wall.

27. An electronic apparatus comprising:
a panel comprising a display screen;
a light source; and
a housing configured to accommodate the panel and the light source, the housing comprising a mask comprising a first wall and a cover comprising a second wall, the first wall comprising a first opening exposing the display screen, and the second wall comprising an inner surface facing the panel and an outer surface opposite to the inner surface, the first wall and the second wall forming an outer shape of the housing in combination, wherein
the second wall comprises a light guide, a non-light guide portion and a groove, at least a portion of the light guide comprising a light transmissive material to pass light from the light source therethrough and to transmit the light from the inner surface to the panel, the non-light guide portion provided around the light guide, and the groove provided between the light guide and the non-light guide portion and configured to reflect at least a portion of light from the light guide; and
at least a portion of the outer surface of the second wall comprises a light shielding layer configured to shield at least a portion of the light from the light guide to an outside of the housing.

28. The electronic apparatus of claim 27, wherein the light guide comprises an inner groove recessed in the inner surface, the inner groove configured to accommodate the light source.

29. The electronic apparatus of claim 27, wherein the light guide comprises an incident surface inclined with respect to the inner surface, the light source is mounted inclining to the inner surface, and a center of the light source faces the incident surface.

30. The electronic apparatus of claim 27, further comprising a member filling in a gap between the light source and the light guide, the member comprising a refractive index closer to a refractive index of the light guide than to a refractive index of air.

31. The electronic apparatus of claim 27, wherein at least a portion of the light shielding layer comprises a reflecting layer on the outer surface, the reflecting layer configured to reflect light from the light guide.

32. The electronic apparatus of claim 27, wherein at least a portion of the light shielding layer comprises a conductive layer, the conductive layer configured to suppress unnecessary radiation of an electric wave from an inside of the housing.

33. The electronic apparatus of claim 27, further comprising an optical sheet between the panel and the second wall.

* * * * *